United States Patent [19]

Wichmann et al.

[11] Patent Number: 5,118,180
[45] Date of Patent: Jun. 2, 1992

[54] METHOD AND APPARATUS FOR DETERMINING THE RANGE OF VISION OF A MOTOR VEHICLE DRIVER UPON ENCOUNTERING FOG OR OTHER OBSTACLE

[75] Inventors: Günter Wichmann, Leimen; Wolf Büchtemann, Tubingen, both of Fed. Rep. of Germany

[73] Assignee: Eltro GmbH, Heidelberg, Fed. Rep. of Germany

[21] Appl. No.: 660,440

[22] Filed: Feb. 22, 1991

[30] Foreign Application Priority Data

Feb. 24, 1990 [DE] Fed. Rep. of Germany ....... 4005919
May 25, 1990 [DE] Fed. Rep. of Germany ....... 4016973

[51] Int. Cl.$^5$ .............................................. G01B 11/30
[52] U.S. Cl. ............................................. 356/5; 356/4
[58] Field of Search .................... 356/4, 5; 342/70; 340/601, 602

[56] References Cited

U.S. PATENT DOCUMENTS

| | | | |
|---|---|---|---|
| 4,419,731 | 12/1983 | Puffett | 356/4 X |
| 4,781,465 | 11/1988 | Demachi et al. | 356/4 X |
| 4,786,164 | 11/1988 | Kawata | 356/4 |
| 4,818,887 | 4/1989 | Weishaupt et al. | 250/561 |
| 4,931,767 | 6/1990 | Albreckt et al. | 340/601 |

FOREIGN PATENT DOCUMENTS

3635396 4/1988 Fed. Rep. of Germany .
3738221 6/1989 Fed. Rep. of Germany .

Primary Examiner—Mark Hellner
Attorney, Agent, or Firm—Michael N. Meller

[57] ABSTRACT

A method and apparatus are provided for determining the range of vision of the driver of an motor vehicle upon encountering a fog. A transmitter and receiving member is mounted on the front portion of the motor vehicle. A series of beam are transmitted from the range finder to different measured portions of the roadway. The reflections from the roadway are monitored. When the atmospheric conditions change so that a fog or other obstacle appears in the roadway, the reflected signal will take on different characteristics or will not appear at all. The driver of the motor vehicle can have a visual and/or an acoustic warning indication inside the vehicle to note that some dangerous condition exists.

18 Claims, 6 Drawing Sheets

METHOD AND APPARATUS FOR DETERMINING THE RANGE OF VISION OF A MOTOR VEHICLE DRIVER UPON ENCOUNTERING FOG OR OTHER OBSTACLE

The present invention relates to a method and apparatus for determining the range of vision of the driver of a motor vehicle as the vehicle approaches fog or an obstacle in the roadway.

The German patent no. DE-PS 22 23 230 describes a method for monitoring the transparency of the atmosphere. This patent is incorporated herein as reference. This patent teaches the use of measuring sections along an automobile roadway, the sections being spaced distances of approximately 50 to 150 meters apart. Transmitters, receivers and warning signs or corresponding indicators are provided. The transmitter and receiver of each measuring section are placed in opposite directions and the receiver of one measuring section communicates with the transmitter from the next measuring section. The signal that is utilized in this arrangement is a light source which may advantageously be a diode operating in the infrared range. The amount of attenuation of the signal along the path from one transmitter in one measuring section to the receiver in the next measuring section is measured. Such attenuation of the electromagnetic radiation is due to fog for example.

Thus in the foregoing measurement, the frequency of the electromagnetic radiation in each measuring section is determined by the attenuation of the previous measuring section. The frequency of the electromagnetic radiation in one preselected measuring section is determined from the beginning of each measuring section and applied to the corresponding indicator. The information as to the variation of the transparency of the atmosphere with respect to the previous measuring section is thereby indicated. Such a method and arrangement requires reliably functioning installations which are fixedly mounted along the road. Due to its high cost of installation, such a system can be used only in preselected locations which are particularly sensitive to the occurrence of fog.

The German patent application DE 32 15 845 C1 which corresponds to European Patent EP 0 092 825 illustrates and describes, in its FIG. 7, a receiver which utilizes a plurality of channels for sensing distances to a target for the firing of missiles. The distance sensor in such an arrangement utilizes a laser rangefinder which operates on the impulse transit time method wherein a transmitter emits impulses in the direction of the desired target. This apparatus uses a plurality of receiving diodes arranged in a number of measuring positions. The diodes convert the impulses reflected from the target into electrical signals.

The apparatus described in this last mentioned reference includes a scanning circuit for providing scanning pulses for scanning the received signals. The scanning pulses are synchronized with but are delayed in a predetermined manner with respect to the transmitted impulses. The scanning pulses are in the form of needle pulses which are short compared with the duration of the received pulses. In this manner when there is relative movement between the sensor and the target and an accompanying phase shift between the received signals and the scanning pulses, a sequence of scanning values are produced. These values represent the amplitude values of consecutive received signals at varying instants within these signals. For the monitoring of a rangefinder zone, it is therefore necessary to phase modulate the scanning pulses as is shown in FIG. 8 of the last mentioned reference. The impulse generator can then be used as a trigger for a monostable multivibrator having a time constant that is varied by a modulation voltage. The trigger pulses are developed from the trailing edge of the output pulses from the monostable multivibrator. The present invention uses this technique to produce its advantageous results.

In accordance with the present invention, it is possible for the driver of a motor vehicle to be provided with information concerning the loss of vision due to a fog lying ahead in the roadway and to determine the range of vision of the driver due to the fog. The method and apparatus incorporating the principles of the present invention provide the possibility that the relative velocity between one motor vehicle and a second motor vehicle in front of the first can be determined. Such an arrangement is not presently known.

In the following drawings, several embodiments incorporating the principles of the present invention are illustrated. The numbers used in one figure for the same item is used in the remaining figures.

Figure 1:
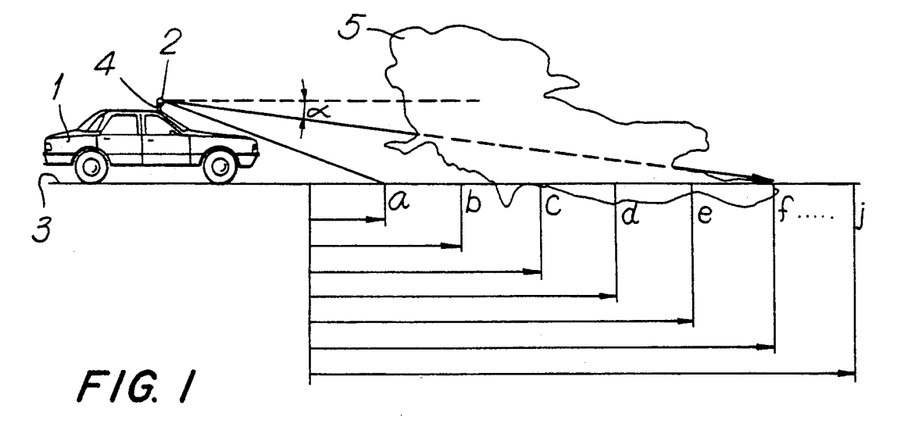
FIG. 1 shows a schematic representation of a method incorporating the principles of the present invention.

Referring to the drawing and more particularly to FIG. 1, it can be seen that a transmitter and receiver of an impulse time operating rangefinder (2) is mounted on the front portion of an automobile (1). This rangefinder can be a laser rangefinder for example.

As illustrated in FIG. 1, the rangefinder can be adjusted to transmit signals towards the roadway (3). The adjustment is provided by an articulated mounting (4) which can change the elevation angle $a$ of the rangefinder with respect to the roadway. The rangefinder will transmit signals to equidistant sections of the roadway (a) to (j) and can do this either continuously or in a stepwise fashion. This change of elevation angle of the rangefinder can be provided by more elegant means. Such means could be a scanning mirror for example.

Figure 1A:
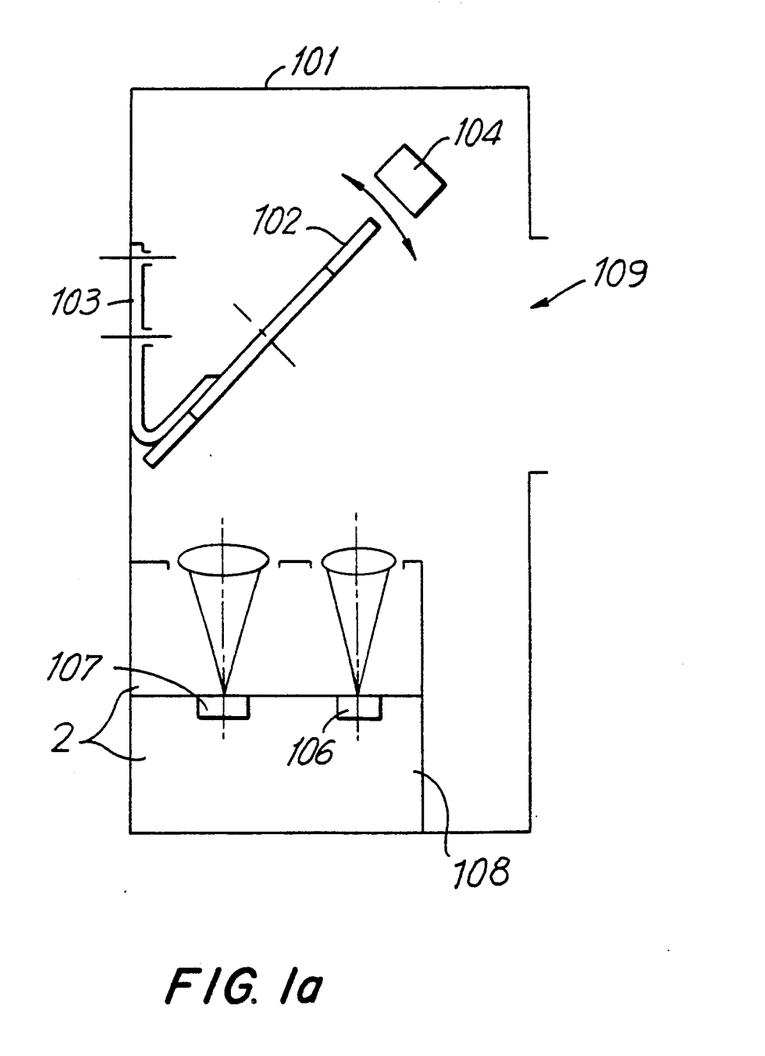
FIG. 1a shows a scanning mirror used with the arrangement of FIG. 1.

Referring to FIG. 1a, such a scanning arrangement is illustrated. Mounted in a housing (101) is a scanning mirror (102) tiltably mounted on an oscillating spring (103). The mirror is moved by a magnetic mirror driving member (104). The scanning mirror (102) is generally made of polished aluminum which in this arrangement would also have a magnetizable metal near the end thereof to be influenced by the magnetic driving member (104).

Also arranged in the housing (101) is the rangefinder (2) having a laser transmitter (106), a laser receiver (107) and electronic circuitry mounted in the box (108). The spring (103) is a leaf spring which vibrates at its natural resonant frequency depending on the properties of the spring and the mass of the mirror.

In operation the transmitter (106) emits a beam which is reflected by the mirror (102) out through a window (109) in the housing (101). After reflection from the roadway, the reflected beam is again reflected by the mirror (102) towards the receiver (107). The received signal is further developed by the electronic circuitry (108) as will be explained subsequently with respect to FIGS. 3 and 4.

The driver of the motor vehicle can proceed without concern as long as the rangefinder, in all of its positions, receives a high amplitude signal. This indicates that the range of vision of the driver is greater than the longest predetermined distance (j). On the other hand if the only high amplitude signal is reflected from the point (a) as the auto nears a fog bank (5), it is then clear that the range of vision of the driver is smaller than the distance (b) and accordingly the driver of the automobile must proceed with the greatest caution.

In another example, the rangefinder (2) can actually comprise a plurality of rangefinders one on top of the other mounted on the front portion of the automobile (1). Each of the rangefinders transmits with a different angle $\alpha$ to the roadway (3). In this way all of the measuring radiations are transmitted simultaneously so that in the last analysis the same information results. It goes without saying that with both embodiments the apparatus will function most efficiently if the roadway in front of the automobile is straight. The driver must sensibly operate the apparatus when he believes himself to be driving along a straight roadway.

With the previously described method of measurement of the range of vision, if necessary the relative velocity between a motor vehicle and the reflecting point may be determined. The measurements made along the roadway (3) will provide this information by using the Doppler effect to determine the velocity of the motor vehicle. If an obstacle (5) is located between the rangefinder and the surface of the roadway, the range of vision with respect to this obstacle can be determined. Also, the relative velocity between the automobile and the obstacle can be indicated. Thus, the rangefinder arrangement can be used to determine the location of the fog as well as the relative velocity of the motor vehicle approaching the fog.

At this time, a complete laser rangefinder is very expensive to manufacture as a mass produced product for the automobile industry. It is thus desirable to utilize other components which can provide precise range of vision measurements with apparatus components of the opto-electronic method such as that described in German Patent Application DE32 15 845 C1 which is also available as European Patent No. EP 0 092 825. These publications are incorporated herein by reference.

Figure 2:
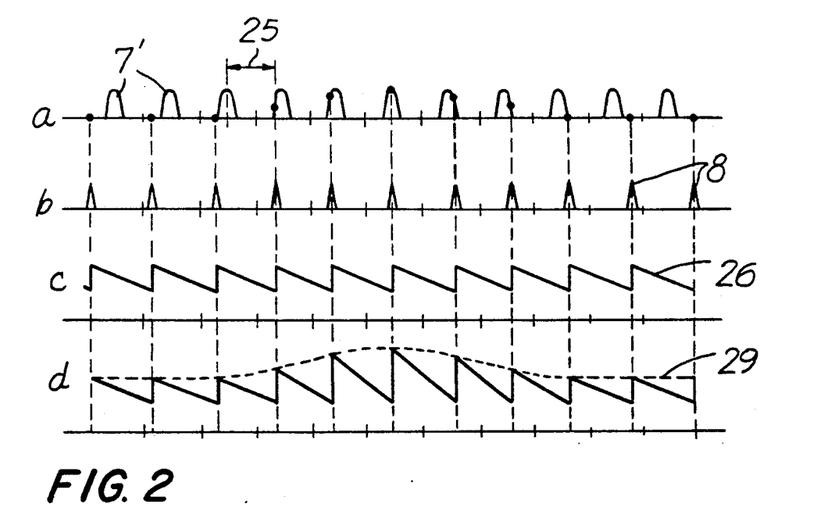
FIG. 2 is a timing diagram of a high frequency oscilloscope representation using a scanning method by means of trigger or needle pulses.

In FIG. 2(a) of the drawing a received signal 7' having a known repetition rate is illustrated. This repetition rate corresponds to the repetition rate of the transmitted signal 7. For this purpose as shown in FIG. 2(b) a scanning or trigger pulse (8) (also known as a sampling pulse) is developed which has the same repetition rate as the received signal impulse. In contrast to the received signal the sampling pulses are phase modulated. In this manner, the sum of the received signals and the scanning pulses have different instantaneous values from one period to the next.

Figure 3:
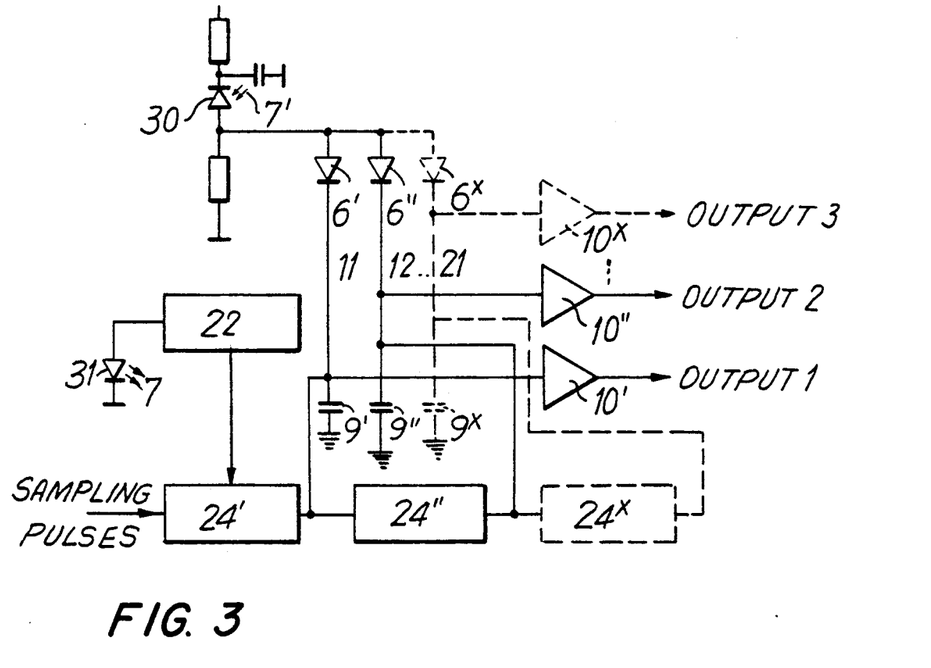
FIG. 3 is a circuit diagram partially in block form of a receiver which simultaneously receives signals reflected from a plurality of measuring points on the surface of a roadway.

In FIG. 3 a plurality of sampling diodes $6'-6^x$ is shown. A plurality of capacitors $9'-9^x$ is also illustrated. Each of these capacitors is arranged respectively in series with a different diode 6' to $6^x$. This arrangement provides channels 11-21. The junction points between each of the diodes 6 and capacitors 9 are respectively connected to a different amplifier $10'-10^x$.

In FIG. 2 the signal pulses 7' are shown on line (a) while the trigger or needle pulses (8) are shown on line (b). Both of these pulses (see FIGS. 3 and 4) are applied to the diodes $6'-6^x$ so that an output voltage is developed on a respective capacitor $9'-9^x$ which output voltage is applied to the respective amplifier $10-10^x$. The resulting sawtooth voltage (26) is shown in FIG. 2(c). The amplitude of the sawtooth voltage (26) corresponds to the sum of the peak amplitudes of both the instantaneous values of the impulse voltage and the trigger impulse.

When the received input signal is zero, the voltage characteristic shown in FIG. 2(c) results. If received signal pulses are present, a low frequency signal (29) such as shown in FIG. 2(d) results. This low frequency signal corresponds to a timewise extension of the original impulse. This described arrangement is a known sampling method utilized by the method and apparatus incorporating the principles of the present invention.

In order to explain the illustrated embodiments, assume that visual ranges up to approximately 100 meters are to be determined. In accordance with FIGS. 1 and 3, the ten measuring points (a)-(j) of the surface of the roadway can correspond to the ten channels 11-21. The corresponding trigger or scanning pulses (8) can be so delayed in time with respect to the transmitted pulses (7) that the scanning pulses will coincide with the pulses reflected back from the 10, 20, 30 . . . 100 m distances. If the transmitted signal contains a measuring beam which is so deflected by a scanning mirror to be applied to the next 100 m distance of the roadway, with more and more precise tilting of the mirror, the trigger or scanning pulses will be in time coincidence with the received impulses (7') of the ten channels (11-21). Thus each channel will have a trigger pulse present at the arrival of the received impulse. The previously necessary phase modulation of the trigger pulses will no longer be needed. A monitoring electronic circuit can be established which can contain additional signals in each channel.

In order to avoid unnecessarily complicating the drawing, a complete explanation of the electronic circuitry involved is not included. This circuitry is not the subject of the present invention since it is part of the above mentioned known sampling methods. In FIG. 3, the impulse generator (22) produces a voltage which is transmitted by the transmitting diode (31) by optoelectronic conversion of the signal impulse (7).

A small part of the impulse forming driving voltage is coupled and used to develop the trigger or scanning pulses (8), shown in FIG. 2(b), after passing through the delaying members (24'-24ˣ). As shown in FIG. 2(a), the delay time (25) corresponds to the total time for the transmitting diode (31) to transmit the signal impulse along the path to the target, contact the roadway (3) and the time for the reflected signal (7') to be received by the receiving diode (30).

If a motor vehicle (1) is equipped with such a sensor and travels along the roadway, no signal will be received as long as the trigger pulses (8) do not coincide with the reflected signal. By the movement of the scanning mirror, the signals reflected from the roadway (3) will be extended in time to coincide with the trigger pulses and be detected.

If it is desired to determine the relative velocity between the moving vehicle and the target, then the apparatus must be used in a different operational mode. The scanning mirror is not moved but is held still and corresponds to the farthest distance in each position. In this arrangement only one of the ten receiving channels (11-21) is utilized. It is necessary to phase modulate the trigger impulses (8) as is explained in the previously mentioned German Patent application DE 32 15 845 C1 and illustrated in FIG. 4 of the drawing.

Figure 4:
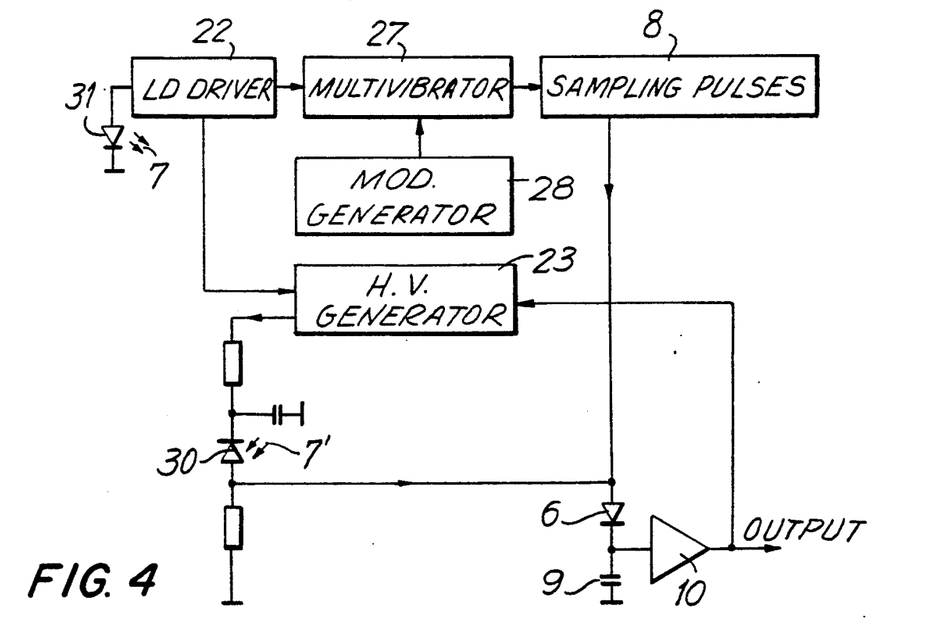
FIG. 4 is a block diagram for the irradiation of an entire measuring zone.

The impulse generator (22) (FIG. 4) can be used as a trigger for the monostable multivibrator (27) shown in block form in FIG. 4. The monostable multivibrator (27) has a time constant which is varied by the modulation voltage received from the modulation generator (28). The trigger impulses are developed from the trailing edge of the output impulses of the monostable multivibrator. The zone to be monitored can be arbitrarily selected. It can be from the point (a) of FIG. 1 up to the maximum distance (j) as well as any of the zones in between this minimum and maximum distance. It is a question whether it is desired to measure the width of the impulse or to measure a plurality of distances whereby the differences between each of the individually measured distances must be determined. In the first place the envelope of the signals as shown in FIG. 2(e) provides the information concerning the desired relative velocity while in the second case the path and time measurements are provided.

In a further embodiment, not illustrated, the scanning mirror can be used as follows: With any type of optical means, such as a cylindrical lens, the transmitting and receiving beams may be arranged in a vertical direction so that all ten of the measuring points (a-j) are obtained. A chopper circuit is arranged before or after the optical arrangement which in a simple manner modulates the transmitting and/or the receiving beams with a 100 cycle frequency for all ten channels (11-21) to provide a yes/no result with respect to the measuring distance to any obstacle that might be present in the path of the automobile. That is, the driver is provided with an indication that he can safely proceed (yes) or that he cannot (no).

Figure 5:
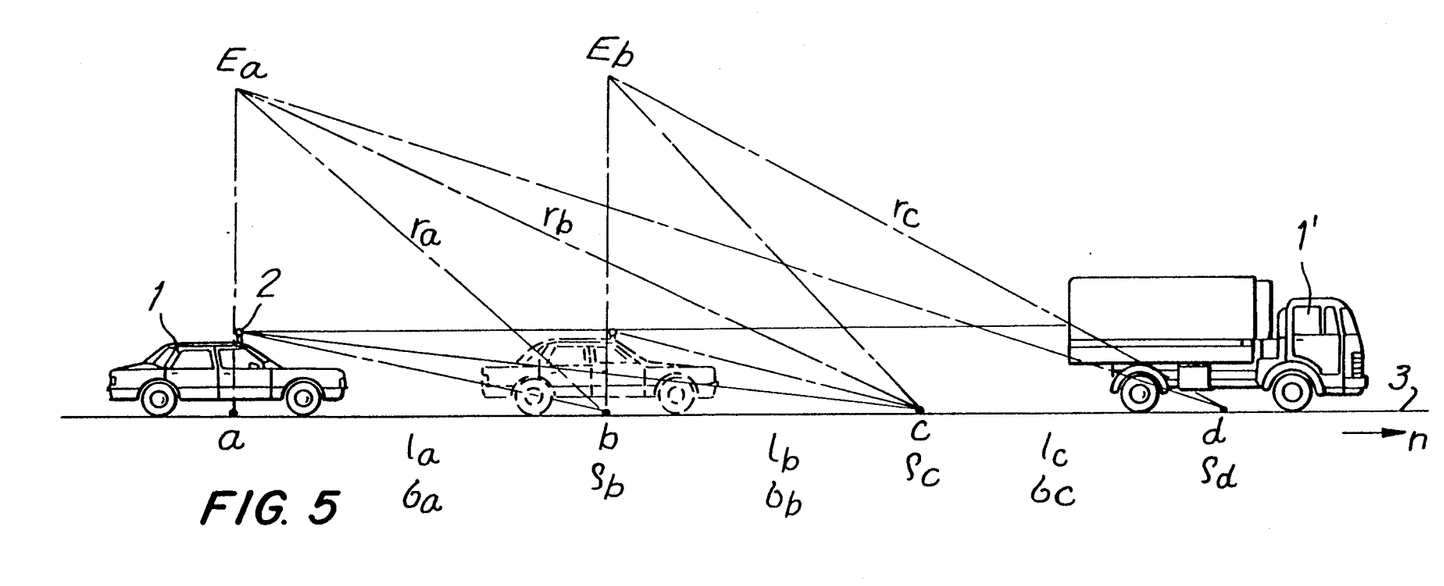
FIG. 5 is another schematic representation of a method incorporating the principles of the present invention showing calculation data.

Referring now to FIG. 5, it can be seen that the motor vehicle illustrated is an automobile (1) which is travelling in line behind a second motor vehicle (1') such as a truck and is located a predetermined distance behind the truck. On the front portion of the auto (1) is mounted a laser rangefinder having a transmitter and receiving module operating in the time sequence method. The rangefinder has an optical axis which can be tilted in the direction of travel along a vertical plane. This can be carried out by an unillustrated optomechanical or electrooptical element arranged in the rangefinder. The transmitting module of the rangefinder transmits beams towards the positions (a-n) on the roadway (3). As reflections from the roadway are received, they are converted by optoelectronic conversion apparatus to optical signals and shown on an indicator 33 (see FIG. 7) located within the automobile. This indication can be visual and/or acoustic as long as the driver of the automobile can be aware of the received signals.

The signal processing system operates by receiving a plurality of reflected signals due to the transmission of consecutive laser pulses. These are laser pulses which operate with the known sampling techniques mentioned above. These are handled in a conventional manner using present day techniques.

Figure 6:
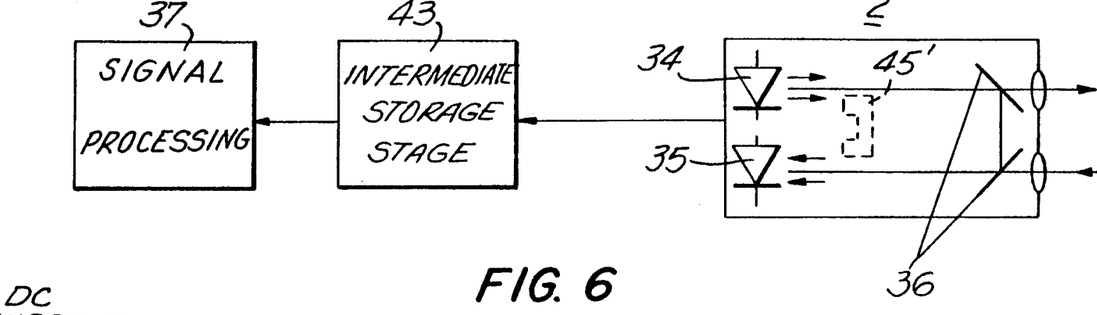
FIG. 6 is a block diagram for the example as shown in FIG. 5.
Figure 7:
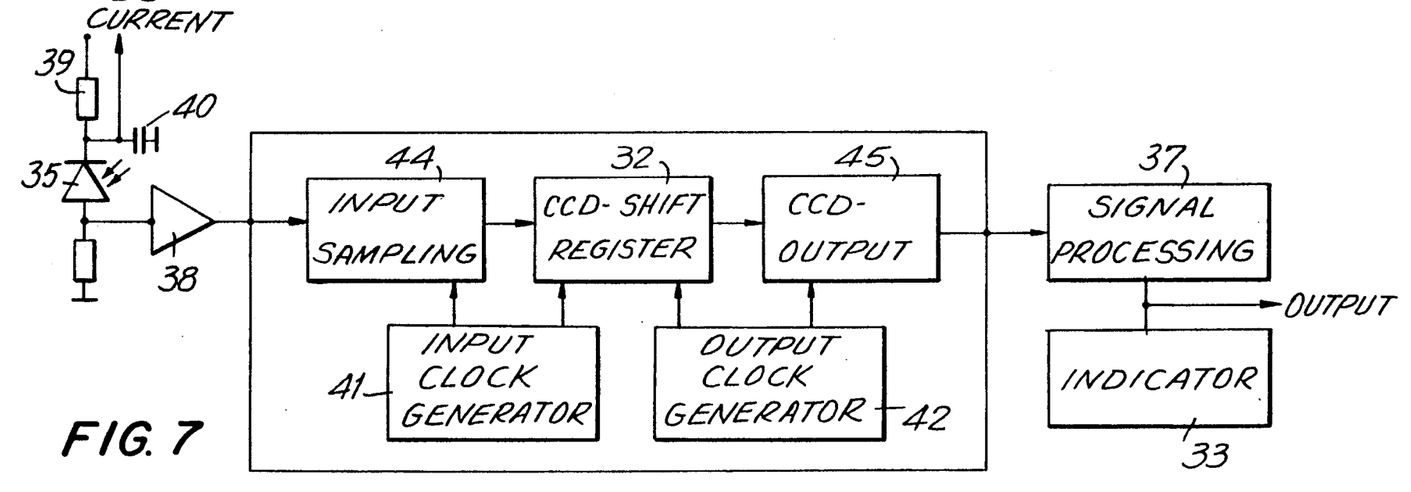
FIG. 7 is a block diagram of the receiving portion of the apparatus incorporating the principles of the present invention for the example shown in FIG. 5.

In FIGS. 6 and 7 are shown partially schematic block diagrams of the signal processing system. The output power P is measured by a system including a receiving diode (35) which receives the reflected signals via a light bridge made up of semi-transparent mirrors (36). The light bridge may include a fiber optic arrangement (45') so that a particular part of the transmitted beams is reflected to reach the receiving diode (35).

The received normalized signal E/P, i.e. received signal E normalized with respect to output power P, is dependent upon the distance $r_i$ of the roadway from which the signal is reflected, the reflection coefficient r of the roadway (3) and the extinction coefficient s of the atmosphere. It can be calculated from the following equation (1):

$$\frac{E}{P} = \frac{\rho}{\pi \cdot r_i^2} e^{-2r_i\sigma} = \frac{\rho}{\pi r_i^2} e^{-2r_i \frac{k}{T_n}} \quad (1)$$

where
$r_1$ = the distance from the reflecting surface in front of the automobile;
r = the reflection coefficient of the surface of the roadway;
s = the extinction coefficient of the atmosphere; and
$V_n$ = the meteorological visual range, that is that distance having a reasonable transmission value of 2% (or 5%).

Basically, only visual ranges up to a maximum distance of 200 meters are of interest. The precise distance ($r_i$) is known by the transit time while a knowledge of the precise value of the reflection coefficient r is not needed provided the correct measuring distance has been chosen. It is then simplest if some reasonable value for the reflection coefficient r is used.

In the calculations, the extinction coefficient s can be eliminated as will be indicated by equation (5) below. The previously unknown reflection coefficient r can be measured by reflections from the same spot, for example, from position (c) in FIG. 5 with respect to different distances. It can also be seen that the value of the received signal E/P varies in direct proportion to the extinction coefficient s while the extinction coefficient is related to the normal range of vision $V_n$ by the equation $V_n = K/s$.

Referring to FIG. 6, equation (1) can be utilized to develop the following equations:

$$E_{ab} = \frac{P \rho_b}{\pi l_a^2} e^{-2\sigma_a l_a} \quad (2)$$

$$E_{ac} = \frac{P \rho_c}{\pi (l_a + l_b)^2} e^{-2(\sigma_a l_a - \sigma_b l_b)} \quad (3)$$

$$E_{bc} = \frac{P \rho_c}{\pi l_b^2} e^{-2\sigma_b l_b} \quad (4)$$

By dividing equation (3) by equation (4) we provide a constant output load P;

$$\frac{E_{ac}}{E_{bc}} = \frac{l_b^2}{(l_a + l_b)^2} e^{-2\sigma_a l_a} \quad (5)$$

In FIG. 2, 3 and 4 the sampling technique was explained. The sampling process can be replaced by a technique using a CCD as an intermediate storage stage. FIG. 6 shows in a simplified block diagram the measuring system (43), being a sampling or an intermediate storage stage. FIG. 7 shows the circuit, in particular the CCD storage stage in great detail. This stage operates in the following manner: After detection of the signal by the receiving diode (35), and transformation thereby into an electrical signal, the signal is amplified in the preamplifier (38). The amplified signal is then applied to the CCD shift register (32) (CCD=Charged Coupled Device) via an input sampling stage (44). The CCD shift register (32) is operated by two separate clock generators, an input clock generator (41) and an output clock generator (42) incorporating an output stage (45).

If the CCD shift register (32) has 128 available stages and operates at an input clock rate of 100 megahertz, then the 128 stages are equivalent to a storage time of 1.28 μs. This corresponds to a distance of 192 meters (10 ns=1.5 meters). If the output clock rate of the CCD shift register is only 5 megahertz (signal expansion by a factor of 20) then as a second step a further processing with elements having a smaller bandwidth is possible. This permits a lower cost. The entire readout time in the foregoing example is 25.6 μs. which corresponds to a good maximum laser pulse repetition rate.

As a further signal processing circuit (analog and/or digital), a known and well understood apparatus with a plurality of laser pulses of approximately 100 ms. can be used. In this arrangement an output curve of the signal as a function of different distances will result. This provides the possibility of determining the typical extinction coefficient $\sigma$. By suitable signal processing, particularly the so called $r^2$ correction, a compensation curve is developed which is a steady line as long as the atmospheric conditions remain constant. The atmospheric conditions will change in the presence of fog and thicker atmospheric conditions will occur at some definite distance in front of the automobile (1) of FIG. 5. The $r^2$ correction means the multiplication of the signal by the square of the distance. With constant ambient conditions and a semilogarithmic representation, a linear relationship is produced. The slope of such straight line is directly proportional to the extinction coefficient s. By an electronic processor supported evaluation of the signals for different distances the value s can be determined without first determining the ratio E/P. In practice this arrangement provides the possibility of an early detection of thickly developing fog in front of the vehicle.

In FIG. 5, the motor vehicle (1) travels from position (a) to position (b). From both positions a signal from location (c) is obtained. The strength of the respective signals is dependent on geometrical factors ($r^2$-dependence) and on the different path lengths leading to a different attenuation. The signal is obtained from the very same spot ensuring the same reflection coefficient. Again, With the aid of FIG. 5 the extinction coefficient can be inferred.

In this way the extinction coefficient s can be precisely determined and with it again the reflection factor r of the surface of the road (3). Especially with flat observation angles the value of r is dependent on road conditions such as dry or wet road conditions or even icy road conditions. The above described method permits the motor vehicle driver to receive a clear statement as to the condition of the surface of the road in front of the motor vehicle.

In a further embodiment (FIG. 8) the transmitter (46) emits polarized radiation. Usually, the laser radiation will be polarized. If needed, one uses a polarizer (47). The receiver consists of two modules (48,49). The first (48) is sensitive with the aid of an analyzer (50) to radiation polarized parallel to the original polarisation. The second (49) uses a crossed analyzer (51) to detect depolarized radiation. The amount of depolarized radiation with respect to underpolarized is dependent on the road condition. A dry surface will produce a strong depolarization whereas a wet or icy road will produce lesser depolarization. The polarization of analyzers (47) and (49) is parallel to the plane of FIG. 8 while that of analyzer (51) is perpendular thereto.

The range of vision can also be determined by the above described measuring system for transmitted beams which are reflected from a vehicle such as a truck 1' (FIG. 5), in the road in front of the motor vehicle 1. This is also true if another object is present on the road. In the event that the velocity between the motor vehicle 1 and the object is desired rather than the range of vision, the operator of the motor vehicle can also have a visual warning by means of the indicator (33) (FIG. 7) or an acoustic warning.

An additional problem of such collision system deals with false alarms which might leave the driver of the motor vehicle to believe that there is some object ahead of the vehicle when actually nothing but the road surface is in front of the vehicle. This develops from several possibilities. If the object on the road is closer to the vehicle than the driver's range of vision, then obviously no early warning system is necessary. However, if the object is just at the edge of the range of vision or is a farther distance in front of the vehicle than the driver's range of vision a problem exists. It is clear that in the last mentioned case it is desired that the range of vision system operate for a distance which is larger than the driver's normal range of vision.

Figure 8:
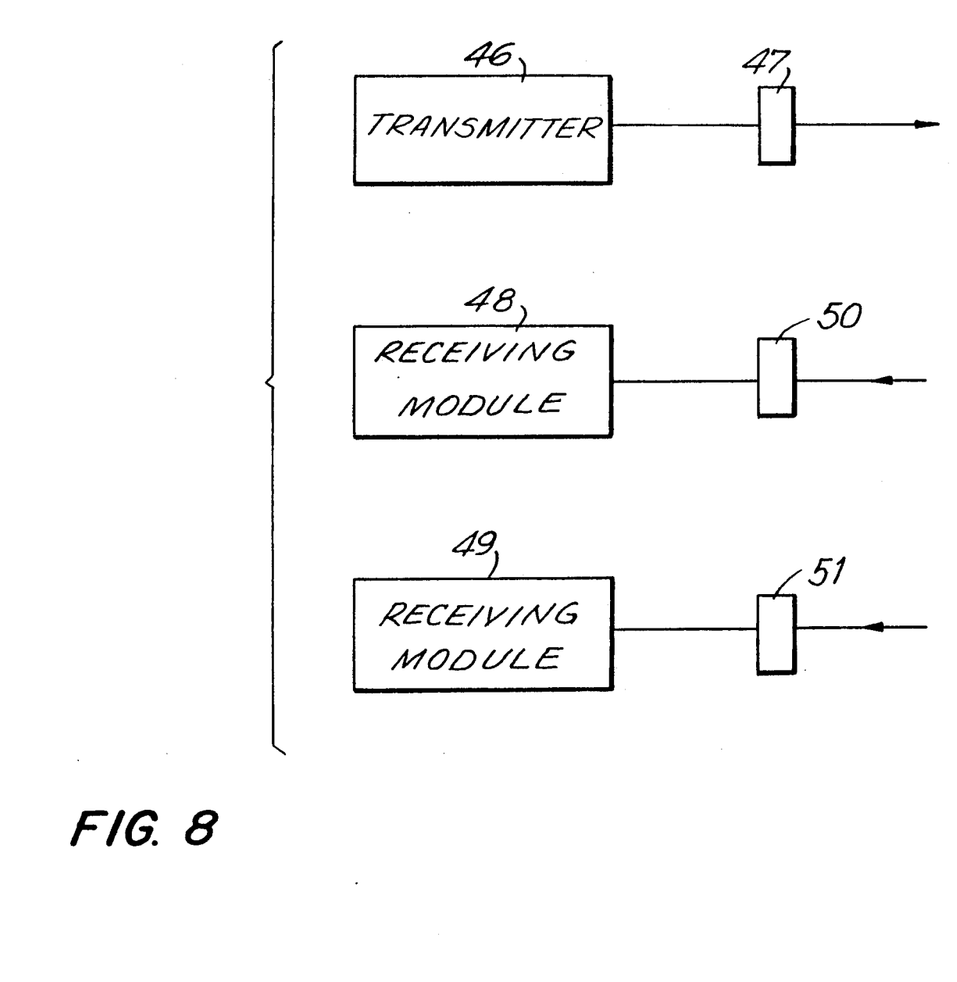
FIG. 8 is a block diagram showing a polarization and depolarization arrangement for use with apparatus incorporating the principles of the present invention.
Figure 9:
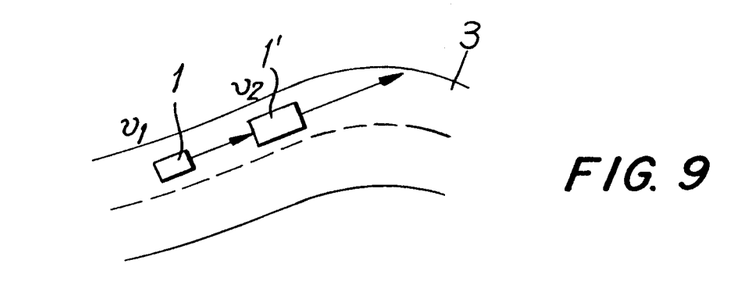
FIG. 9, is a plan view of a special arrangement incorporating the principles of the present invention for use in driving along an automobile roadway.

The example illustrated in FIG. 8 clearly demonstrates the situation. Referring to this figure, the rear vehicle (1) having a velocity $v_1$ is provided with a warning if the relative velocity between the vehicle (1) and the vehicle (1') ($v_1-v_2$) exceeds a value that can be ascertained of the driver's normal range of vision. The system of the vehicle (1') provides a warning if the roadway has a sharp curve as shown in FIG. 8. This is particularly true if the curve is not easily seen and the velocity of the motor vehicle is high.

Obstacles in the path can be determined as shown by the discontinuous lines of FIG. 5. The motor vehicle (1) is shown in two separate locations with respect to the motor vehicle (1'). The system checks the measuring points from (a) thru (n). In a systematic way, larger signals will be received with an empty road in front of the vehicle. The precise characteristic of the information provided to the vehicle will depend on changes in the slope and curvature of the roadway as compared to the general characteristic. An obstacle in the roadway will interrupt this characteristic and will therefore be noted.

The normal range of vision $V_n$ is after all, a clearly defined magnitude. The conventional visionally relevant ranges of vision depends on different environmental parameters. These parameters include the light intensity of the surrounding environment such as the light intensity of the surface of the road. This can be measured in a simple manner using DC current by means of the conductor branches (39), (40) of FIG. 7 and in this manner a fair range of vision can be determined.

We claim:

1. A method for determining the range of vision of a driver of a motor vehicle on a roadway upon encountering fog comprising the steps of:
   a) mounting a range finder having a transmitter and receiver on the front portion of said motor vehicle;
   b) transmitting a signal from said transmitter angled towards the surface of the roadway a first distance in front of said vehicle, said signal being attenuated by fog in the atmosphere;
   c) receiving a signal at said receiver reflected from said first distance of said roadway surface; and
   d) repeating steps b) and c) for a plurality of distances greater than said first distance up to a predetermined distance, said signals being reflected to said receiver as long as the roadway up to said predetermined distance in front of said vehicle is clear, at least one of said signals being attenuated and not reflected back to said receiver when fog is present in front of said vehicle at a distance less than said predetermined distances.

2. A method for determining the range of vision of a driver of a motor vehicle on a roadway upon encountering a fog comprising the steps of:
   a) mounting a plurality of range finders, each of which includes a transmitter and receiver, on the front portion of said motor vehicle, each of said range finders having a different angle of inclination with respect to the surface of said roadway in front of said vehicle and being superimposed one above the other;
   b) simultaneously transmitting signals from said transmitters to said surface of said roadway a plurality of different distances in front of said vehicle up to a predetermined distance, said signals being attenuated by fog in the atmosphere; and
   c) simultaneously receiving signals reflected from said roadway at respective receivers corresponding to said transmitters, said signals being reflected to said receivers as long as the roadway is clear up to said predetermined distance, at least one of said signals being attenuated and not reflected back to said receivers when fog is present in front of said vehicle at a distance less than said predetermined distance.

3. A method in accordance with claim 1 comprising the steps of coupling a speed indicator with said range finder and using the Doppler effect to measure the distance to an obstacle on said roadway in the path of said motor vehicle.

4. A method in accordance with claim 2 comprising the steps of coupling a speed indicator with each of said range finders and using the Doppler effect to measure the distance to an obstacle on said roadway in the path of said motor vehicle.

5. A method in accordance with claim 1 comprising the steps of using a distance sensor as said range finder, said distance sensor including a transmitter for transmitting high frequency impulses, a scanning circuit, including a receiving diode, for scanning said received signals by scanning pulses synchronized with but delayed in a predetermined manner with respect to said transmitted impulses, providing a number of sampling diodes corresponding to said plurality of distances for converting the high frequency electrical signals received by said receiving diode to low frequency visible impulses wherein:
   a) a scanning mirror directs said transmitted and received signals a plurality of distances in front of said motor vehicle, said distances being equidistant with respect to each other and said impulses are applied to the roadway from the closest to the farthest distance up to said predetermined distance or vice versa;
   b) said scanning pulses being delayed relative to said transmitted impulses an amount such that said scanning pulses coincide with said received signals reflected from said plurality of distances; and
   c) providing additional signals in said received channels to ascertain the range of vision of the driver.

6. A method as claimed in claim 5 Wherein a monostable multivibrator having a time constant is included to produce said scanning pulses, a modulation generator is coupled to said multivibrator and has an output voltage for varying said time constant, an impulse generator is coupled to the input of said multivibrator for triggering said multivibrator whereby a scanning pulse is produced from the trailing edge of the output pulse of said monostable multivibrator, using only one channel to determine the relative velocity between said moving vehicle and the distance in the roadway reflecting said transmitted signal, said scanning pulses being phase modulated and the envelope of the low frequency impulses developing the information concerning said relative velocity.

7. A method in accordance with claim 1 including the steps of:
   a) developing a compensation curve having an $r^2$ correction for signals which vary as a function of different distances, said curve having a geometric characteristic which makes possible an early warning detection of a thickly forming fog,
   b) obtaining the output P/E from the ratio of the amplitude of the transmitted to the received signals in order to determine the normal range of vision and its mathematically related extinction coefficient, and/or
   c) determining the distance between said motor vehicle and an obstacle in the roadway by optically converting the received signal and applying said converted signal to a CCD shift register, the time for storing said signals in said storage register being a measure of said distance.

8. A method in accordance with claim 7 including the step of determining the visually relevant range of vision from the extinction coefficient, the reflection factor of the roadway as well as the environmental factors such as the ambient light intensity and the light intensity of the roadway.

9. A method in accordance with claim 7 including the step of using polarized signals for measuring the distance to the roadway, to a vehicle or other obstacle in front of said motor vehicle, and receiving the separately reflected signals parallel to t the linearly polarized transmitted signals as well as those perpendicular thereto.

10. A method in accordance with claim 8 wherein the ambient light intensity as well as the light intensity of the roadway is measured as a function of DC current of the branch conductor of the receiving diode.

11. Apparatus for determining the range of vision of a driver of a motor vehicle on a roadway upon encountering a fog, comprising a range finder mounted on the front portion of said motor vehicle, said range finder including a transmitter for sending out signals angled towards the surface of said roadway a plurality of sequentially increasing distances in front of said vehicle up to a predetermined distance and a receiver for receiving reflected signals from said plurality of distances, whereby said signals are reflected to said receiver as long as said roadway up to said predetermined distance in front of said vehicle is clear, at least one of said transmitted signals being attenuated and not reflected back to said vehicle when fog is present in front of said vehicle at a distance less than said predetermined distance, and indicating means for the driver of said vehicle for monitoring said received signals.

12. Apparatus as claimed in claim 11 wherein said range finder is fixedly mounted on said motor vehicle and a scanning member is arranged in the path between said transmitter and said roadway so that the distances being reached by said transmitted signals up to said preselected distance is increased by said scanning member by changing the angle of inclination of said transmitted signal to said roadway, a chopper circuit is coupled to said transmitter for providing scanning pulses for triggering said transmitted signals, delaying means coupled to said chopper circuit for delaying said scanning pulses so that they coincide in time with the detection of said reflected pulses, and a plurality of channels arranged between said transmitter, said receiver and said roadway so that a yes/no result for the motor vehicle proceeding without danger is obtained from the coinciding scanning pulses and received signals.

13. Apparatus in accordance with claim 11 wherein a plurality of range finders are mounted on the front portion of said motor vehicle, each of said rangefinders having a transmitter and receiver and a different angle of inclination with respect to the surface of said roadway, said range finders being superimposed one above the other, whereby said range finders simultaneously transmit a plurality of signals from said transmitters to said surface of said roadway a plurality of different distances in front of said vehicle up to a predetermined distance, said signals being attenuated by fog in the atmosphere so that said receivers receive reflected signals only from those distances of said plurality of distances not covered by fog.

14. Apparatus for carrying out the method of claim 7 wherein said range finder is a laser range finder and includes a transmitting diode and a receiving diode, said transmitting diode transmitting signals along a first path to said plurality of distances of said roadway and said receiving diode receiving reflected signals along a second path from said plurality of distances, a light bridge arranged in said paths between said range finder and said plurality of distances in said roadway for selecting a predetermined portion of the reflected signals received by said receiving diode and applying said selected portion of said signals to a circuit comprising a preamplifier, a CCD shift register and a signal processing circuit, in the order named, and indicator means coupled to said signal processing circuit for making the result of said received and processed signals visible to said driver of said motor vehicle.

15. Apparatus as claimed in claim 14 wherein said light bridge comprises a semitransparent mirror.

16. Apparatus as claimed in claim 14 wherein said light bridge comprises fiber optic elements.

17. Apparatus as claimed in claim 14 wherein said CCD shift register is coupled in circuit with two separate clock generators, one clock generator being coupled to the input of said shift register and the other coupled to the output of said shift register.

18. Apparatus as claimed in claim 14 wherein said receiver of said range finder is of the polarized type.

* * * * *